Oct. 6, 1953          D. L. SHOEMAKER          2,654,233
AIR CONDITIONING UNIT FOR CASEMENT WINDOWS
Filed May 31, 1951                                2 Sheets-Sheet 1

INVENTOR.
Dwight L. Shoemaker
BY
ATT'YS

Oct. 6, 1953 D. L. SHOEMAKER 2,654,233
AIR CONDITIONING UNIT FOR CASEMENT WINDOWS
Filed May 31, 1951 2 Sheets-Sheet 2

INVENTOR.
Dwight L. Shoemaker
BY
Murray, Sachoff + Murray
ATT'YS

UNITED STATES PATENT OFFICE 2,654,233

AIR CONDITIONING UNIT FOR CASEMENT WINDOWS

Dwight L. Shoemaker, Cincinnati, Ohio

Application May 31, 1951, Serial No. 229,043

5 Claims. (Cl. 62—140)

The present invention relates to air conditioning apparatus for the rooms of buildings and is particularly directed to a novel air conditioning unit that is adapted for mounting in the frame opening of a casement window sash.

The conventional self-contained air conditioning units are specifically adapted for mounting in the frame openings of vertically slidable sashes and are therefore relatively wide with respect to their heights. These units are generally mounted upon the sills of said windows and the sashes are vertically adjusted so that the latter are in contact with the tops of the casings for these units. The casement window, now widely used in buildings, has a heightwise dimension substantially greater than its width and presents an installation problem for these conventional air conditioning units in that said units can only be mounted within so-called "double casement" windows by cutting away the lower portion of the center post between the frames of two casement windows and closing off substantially two thirds of the window openings above the unit by a built-in false window. The utilization of floor type air conditioning units has been proposed for casement windows wherein certain panes of glass have been removed from the windows and permanent air ducts led from the units to the outside through the openings in the windows made by removal of the panes. In either of the foregoing structures it has been extremely difficult and at times impossible for the housewife to clean the weather side of the panes of casement windows provided with these air conditioning units. Furthermore each structure required long and expensive installation work which often involved structural changes of a permanent nature in the casement windows and were objectionable for that reason alone.

The object of the present invention is to provide a compact air conditioning unit that can be readily installed in the frame of a casement window with a minimum of labor and without in any way modifying the structure of either the casement window sash or its frame.

Another object of the invention is to provide an air conditioning unit of the character described which fits in the opening defined by the frame of a single casement window thereby affording access to the exterior of the usual "double casement" window through the remaining frame opening for cleaning the exterior surfaces of the window panes in the usual manner.

A still further object of this invention is to provide an air conditioning unit which has a novel arrangement of parts and casing structure to effect the foregoing objects of the invention, consisting in the general assembly and particular parts and combinations and arrangements of parts thereof as hereinafter described, and defined in the appended claims, reference being had to the accompanying drawing which is illustrative of a practical adaptation of the invention, and in which:

Fig. 4 is a section taken on line 4—4 of Fig. 1.

Fig. 5 is an enlarged section taken on line 5—5 of Fig. 4.

Figure 1:
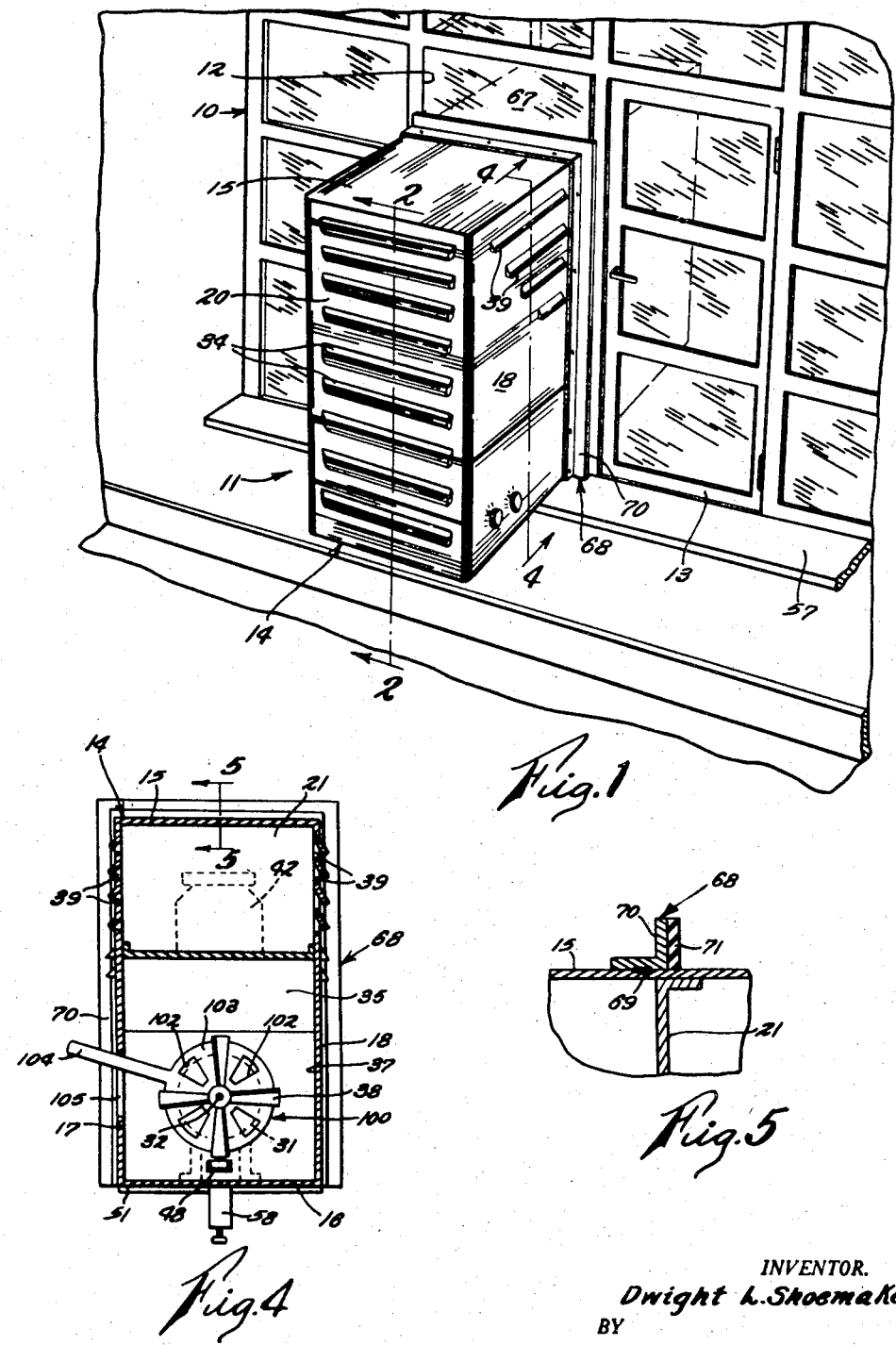
Fig. 1 is a perspective view of my air conditioning unit observed from the interior side of a casement window.
Figures 2, 3:
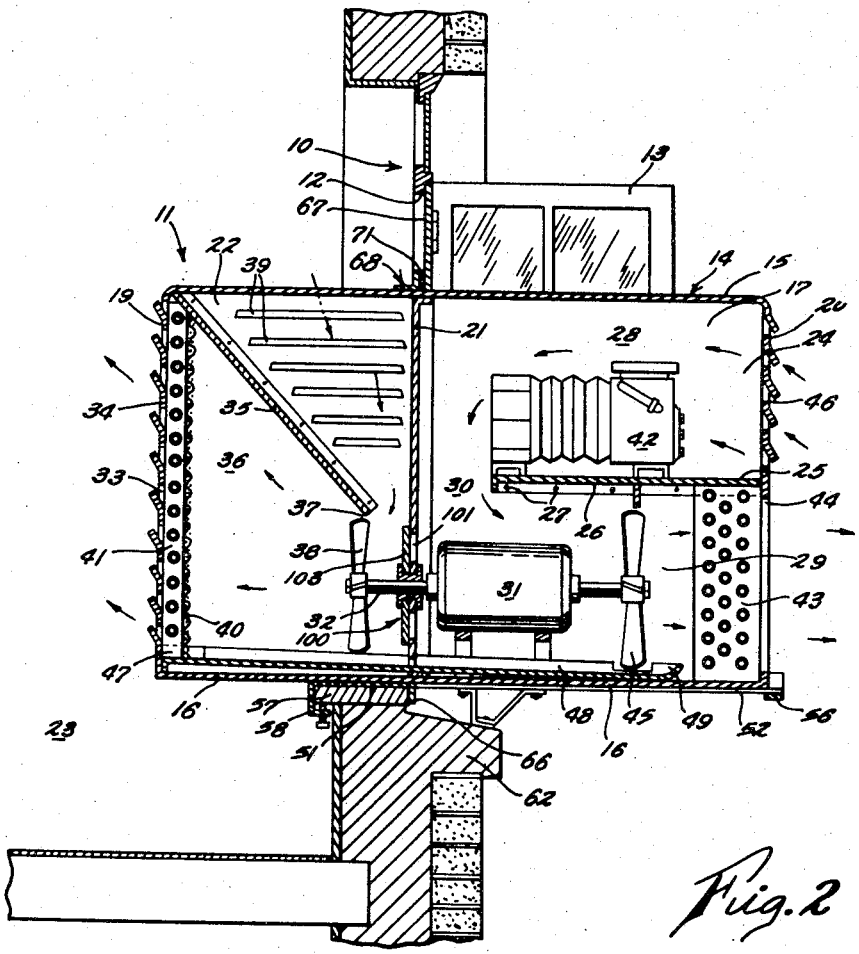
Fig. 2 is a section taken on line 2—2 of Fig. 1.
Fig. 3 is a perspective view of the saddle mounting for my unit in a casement window.

Referring first to Figs. 1 and 2 the numeral 10 indicates the usual "double casement" window and the numeral 11 refers to my air conditioning unit mounted within the lower portion of the frame opening 12 for one of the two swingable sashes 13 of the "double casement" window.

The air conditioning unit 11 is contained in a closed, sheet metal casing 14 of substantial depth that has a heightwise dimension substantially greater than its width. The casing 14 comprises a top wall 15, a bottom wall 16 interconnected by side walls 17 and 18, a front wall 19 and a rear wall 20. A vertical partition 21 extends across the casing and serves to divide the casing into a front compartment 22 which extends into the room 23 of a building, and a rear compartment 24 disposed exteriorly of the building.

As best shown in Fig. 2 a horizontal partition 25 extends across the back portion of the rear compartment 24 and may be positioned therein by means of side flanges 26 formed on the side portions of the partition and secured by metal screws 27 to the side walls 17 and 18 respectively of the casing structure. This partition divides the rear compartment into an upper section 28 and a lower section 29, said partition terminating short of the partition 21 to form a communicating passageway 30 between said upper and lower rear compartment sections.

A fan drive motor 31 is mounted upon the bottom 16 within the lower, rear compartment section 29 and has a rotor shaft 32 which extends forwardly through an opening formed in the partition 21. A major portion of the front wall 19 of the casing has an air outlet opening 33 formed therein which may be guarded by a grille assembly 34 suitably positioned on the casing across the air outlet opening 33. A downwardly inclined, rearwardly extending baffle plate 35 extends across the front compartment 22 and forms with the casing side walls 17 and 18 to which it is suitably attached, an air duct 36 communicating with the air outlet opening 33 in the casing and terminating in a reduced air inlet opening 37 for a fan 38. The fan 38 is fixed on the rotor shaft 32 and shall be referred to hereinafter as the "first fan."

The side walls 17 and 18 are each provided with air intake openings 39 located in the forward portions thereof and above the baffle plate 35. The fan 38 is adapted to draw air from the room 23 through the air intake openings 39 in the side walls of the casing and thence through the fan opening 37. The air drawn through the opening 37 is forced by the fan through an air filter 40 and an evaporator 41 both located within the duct 36 adjacent the air outlet opening 33 in the front wall 19 of the casing; the cooled and cleaned air then passing through the grille openings 34 out into the room 23.

A motor compressor unit 42 and a condenser 43 are housed within the rear compartment 24 and are connected in a well known manner to the evaporator 41. The motor compressor unit 42 is mounted upon the forward portion of the horizontal partition 25 whilst the condenser 43 is positioned in the lower section 29 of the rear compartment adjacent an air outlet opening 44 formed in the rear wall 20 of the casing structure. A second fan 45 is fixed to the rearward end of the fan rotor shaft 32 and is adapted to draw outside air through an air inlet opening 46 formed in the upper portion of the casing rear wall 20 and over the motor compressor unit 42, thence downwardly through the opening 30 between the rear compartment sections 28 and 29, and then across the fan motor 31. The air is then forced by the second fan 45 through the condenser coils 43 and outwardly through the air outlet opening 44 to the atmosphere.

A condensate pan 47 is located beneath the evaporator 41 for receiving moisture which may collect on the relatively cold coils of the evaporator from the room air passed therethrough by fan 38. The pan is connected to a conduit 48 which extends through the vertical partition 21 and is inclined downwardly and rearwardly with respect to the pan. Said conduit terminates at 49 in a position below the second fan 45 and within range of the stream of air delivered by the fan to the condenser 43, whereby condensate collecting in the terminal end 49 of the conduit will be either evaporated by the said stream of air or carried by said stream in small droplets against the relatively warm coils of the condenser 43. In the latter instance the water droplets will be evaporated upon contact with the coils and the vapor carried off by the air stream of fan 45.

Under certain conditions it is desirable to introduce outside air into the room by means of fan 38. This is accomplished by a normally closed, oscillating disk valve 100 mounted on the partition 21 concentric with the fan rotor shaft 32. The partition has a number of angularly spaced openings 101 located around the said shaft opening therein which are normally out of registry with openings 102 in an oscillating disk 103. A handle 104 is connected with this disk and extends through a slot 105 in the casing side wall so that the disk 103 may be rotated to bring the openings 101 and 102 into full or partial registry. When the openings are in registry and the fan 38 in operation the valve permits passage of outside air from the rear compartment therethrough to the fan 38 in the front compartment and thence through the air outlet opening 33 into the room.

My air conditioning unit is supported within the casement window opening 12 by a special saddle 50, and as best shown in Fig. 3, the saddle consists of a base plate 51 and a pair of spaced arms 52 and 53 extending rearwardly from each side thereof. The arms have upstanding guide flanges 54 and 55 respectively that are adapted to snugly receive the lower edge portion of the respective sides 17 and 18 of the casing structure 14. The free ends of the arms are connected together by a cross member 56 which provides lateral rigidity for the saddle arms. The base plate 51 is secured to the sill 57 of the casement window by means of a clamp 58, said clamp being a U-shaped piece connected to the base plate and having a set screw 59 in its free end for clamping engagement beneath the sill. Each arm 52 and 53 has a longitudinally adjustable foot 60 and 61 respectively depending therefrom and adapted to engage the exterior portion 62 of the casement window sill to provide a firm support for the saddle within the window frame opening. Longitudinal adjustment of the feet is effected by providing a pair of spaced slots 63 in each arm and passing bolts 64 therethrough and into clamping connections with mounting flanges 65 of the respective feet. The base plate also has a downturned flange 66 located along its rearward edge and between the arms, which, as shown in Fig. 2, abuts against the exterior edge of the window sill 57.

As indicated in Figs. 1 and 2 one casement window 13 is in open position after installation of my air conditioning unit 18. My unit may have a heightwise dimension less than the height of the window opening 12, in which event an insert panel 67 is adapted to close the upper portion of the frame opening 12 above the casing structure for the unit; said insert being secured in the frame in any suitable manner. A continuous angle iron 68 extends around the outside of the side walls 17 and 18 and the top wall 15 of the casing structure and is secured thereto by welding 69, or the like. This angle iron has an outwardly extending flange 70 which is in or adjacent the planar extension of the vertical partition 21 to provide added rigidity to the sheet metal casing structure. The flange 70 has cemented to its outer face a rubber gasket 71, said gasket being adapted to make an air tight connection with the insert 67 and the frame opening of the casement window when the casing structure is in operative position in the casement window.

It will therefore be understood that I have provided a self-contained air conditioning unit specifically adapted for mounting within a casement window. To install my unit in the casement window it is only necessary to swing the window 13 to opened position, clamp the saddle to the interior sill 57 and adjust the saddle feet 61 to the slope of the exterior sill 62 so that the base plate and arms are in a horizontal position. The unit may then be slid along the saddle with the spaced side flanges 52 and 53 of the arms as guides until the seal of the angle iron 68 comes in contact with the casing window frame. Thereafter the insert 67 may be installed to seal off any portion of the window opening left open above the unit. It will be noted that the relatively heavy parts of my unit, such as the fan motor 31, motor compressor 42 and the condenser 43, are housed in the rear compartment to the end that the unit tends to overbalance toward the exterior of the building, which effectively holds the angle iron and its seal against the window frame and the insert 67 to provide an air tight connection between the unit and the frame opening. To clean the weather sides of the panes of glass it is only necessary to open the casement window 13 adjacent my installed unit which is the right-hand window with respect to the showing in Fig. 1 of the drawings. With said window opened all the glass panes may be reached and cleaned including the permanent top light windows of the usual casement window.

What is claimed is:

1. In a self-contained air conditioning unit to be mounted in a casement window the combination of a closed casing structure having a heightwise dimension substantially greater than its width, a vertical partition dividing the casing into a front and a rear compartment, a horizontal partition disposed across the back portion of the rear compartment and dividing said compartment into an upper and a lower section communicating with each other forwardly of the said partition, a fan drive motor positioned in the lower section of the rear compartment and having one end of its rotor shaft extending through the vertical partition, an air outlet opening formed in the major portion of the front wall of the casing, a downwardly inclined, rearwardly extending plate in the front compartment forming with the casing side walls an air duct communicating with the said air outlet opening and terminating in an air inlet opening for a fan, a first fan disposed in said air inlet opening and secured to the said end of the fan rotor shaft, an evaporator disposed within the duct adjacent the opening in the front casing wall, an air intake opening formed in a side of the front compartment rearwardly of the duct, said air inlet opening for the fan being connected to said intake opening in the side of the compartment, a compressor and a condenser connected in the evaporator circuit, said compressor being mounted upon the horizontal partition and disposed within the upper section of the rear compartment, an air inlet opening formed in the rear wall of the casing and communicating with the upper section of the rear compartment, an air outlet opening formed in the rear wall of the housing and communicating with the lower section of the rear compartment, the condenser being disposed within the lower section adjacent said opening, a second fan mounted on the rear end of the said fan rotor shaft and disposed in front of the condenser, said fan being adapted to draw air through the first mentioned opening in the rear casing wall and across the compressor and to force said air through the condenser and out through the second mentioned opening in the rear casing wall.

2. A self-contained air conditioning unit as set forth in claim 1 wherein a condensate pan is located beneath the evaporator, and a conduit communicates with the pan and is inclined downwardly and rearwardly with respect to said pan, said conduit terminating beneath the second fan and within the range of the stream of air delivered by said second fan to the condenser.

3. A self-contained air conditioning unit as set forth in claim 1 wherein the casing structure is made of sheet metal and has a lateral configuration adapted to snugly fit in the lower portion of the frame opening for the casement window, air tight means for supporting the casing structure on a sill for the casement window, an insert closing the frame opening above the casing structure, and a continuous flange projecting outwardly from the sides and top of the casing structure and adapted to abut the insert and the frame in air tight relationship therewith.

4. A self-contained air conditioning unit for mounting within the frame opening of a single casement window, said unit having a closed casing with a heightwise dimension proportionally greater than its width dimension, a vertical partition dividing the casing into a front evaporator compartment situated within the space to be conditioned and a rear compressor-condenser compartment located outside of said space, and air outlet opening formed in a major portion of the front wall of the casing, an evaporator positioned within the casing behind the outlet opening, a downwardly inclined plate located within the front compartment and extending rearwardly from the upper front corner of the said compartment and forming with the casing side walls, first, a restricted fan opening within the rear lower portion of the said compartment, secondly, a downwardly converging intake air duct leading to said fan opening and thirdly, a forwardly diverging air outlet duct leading from said fan opening to the air outlet opening in the front wall, air inlet openings formed in the front evaporator compartment for admitting air into the inlet air duct, and an air circulating fan mounted in the restricted fan opening.

5. A self-contained air conditioning unit for mounting within the frame opening of a single casement window, said unit having a closed casing with a heightwise dimension proportionally greater than its width dimension, a vertical partition dividing the casing into a front evaporator compartment situated within the space to be conditioned and a rear compressor-condenser compartment located outside of said space, a horizontal partition disposed across the back portion of the rear compartment and dividing said compartment into an upper compressor housing and a lower condenser housing; said housings communicating with each other by a flue formed between the vertical partition and the forward end of the horizontal partition, air inlet openings formed in the casing for admitting air into the upper housing, air discharge openings in the lower portion of the rear wall of the casing, a condenser located within the lower housing and behind the air discharge openings, and a fan located in the lower housing and adapted to draw air through the air inlet openings and across the compressor, thence through the flue and to force said air through the condenser and out through the air discharge openings.

DWIGHT L. SHOEMAKER.

References Cited in the file of this patent
UNITED STATES PATENTS

| Number | Name | Date |
|---|---|---|
| 2,081,106 | Kilb | May 18, 1937 |
| 2,278,989 | Gruitch | Apr. 7, 1942 |
| 2,294,664 | Hubbard | Sept. 1, 1942 |
| 2,357,362 | Smith | Sept. 5, 1944 |
| 2,386,883 | Ames | Oct. 16, 1945 |
| 2,405,411 | Dybvig | Aug. 6, 1946 |
| 2,433,104 | Eberhart | Dec. 23, 1947 |
| 2,610,483 | Deering | Sept. 16, 1952 |